United States Patent [19]

Acheson

[11] Patent Number: 4,687,899
[45] Date of Patent: Aug. 18, 1987

[54] AUTOMATIC WELDING APPARATUS FOR WELD BUILD-UP AND METHOD OF ACHIEVING WELD BUILD-UP

[76] Inventor: Rees Acheson, Hill Rd., Alstead, N.H. 03602

[21] Appl. No.: 945,182

[22] Filed: Dec. 23, 1986

Related U.S. Application Data

[63] Continuation of Ser. No. 207,341, Mar. 1, 1985, abandoned.

[51] Int. Cl.$^4$ .............................................. B23K 9/04
[52] U.S. Cl. ............................. 219/76.14; 219/125.11; 219/137.9
[58] Field of Search ................. 219/76.1, 76.12, 76.14, 219/125.1, 125.11, 137.9, 136, 125.12

[56] References Cited

U.S. PATENT DOCUMENTS

| | | | |
|---|---|---|---|
| 3,536,886 | 10/1970 | Juelg et al. | 219/125.1 |
| 3,568,029 | 3/1971 | Bollinger | 318/578 |
| 3,582,749 | 6/1971 | Wenzel | 318/571 |
| 3,795,785 | 3/1974 | Smith | 219/125.1 |
| 3,815,807 | 6/1974 | Bartley | 219/125.1 X |
| 3,978,310 | 8/1976 | Gleason | 219/76.1 X |
| 4,160,895 | 7/1979 | Hopper | 219/125.1 |
| 4,215,809 | 8/1980 | Davis | 228/48 |
| 4,229,641 | 10/1981 | Ihara | 219/125.1 |
| 4,242,981 | 1/1981 | Benard et al. | 219/76.1 X |
| 4,248,371 | 2/1981 | Melton | 228/7 |
| 4,323,750 | 4/1982 | Marmorat et al. | 219/76.1 |
| 4,328,412 | 5/1982 | Watanabe et al. | 219/125.1 |
| 4,403,136 | 9/1983 | Colman | 219/137.31 |
| 4,550,235 | 10/1985 | Füwesi | 219/76.14 |

OTHER PUBLICATIONS

C. C. Peck Company Brochure, "Welding With Machine Tool Concepts", Reprinted from Automation, Jun. 1975.
C. C. Peck Company Circular, "Line Welds 1000 Tanks Per Shift," Reprinted from Tooling & Production Magazine, Jan. 1979.
C. C. Peck Company Circular, "Plasma Arc Valve Surfacing," Reprinted from Tooling & Production Magazine, Dec. 1975.
C. C. Peck Company Circular, "Applied Welding," Reprinted from Welding Engineer, Mar. 1974.

*Primary Examiner*—E. A. Goldberg
*Assistant Examiner*—C. M. Sigda

[57] ABSTRACT

A welding apparatus is disclosed for circular welding an outer surface or a bore surface of a metallic object. The apparatus consists of a rotatable spindle, a rotatable power connector connected to the spindle, and an offset adjustment device connecting the spindle to an orbital welding torch. A weld nozzle is provided at one end of the torch. A wire feed device is connected to the spindle. The welding apparatus is provided with a wire transmission conduit, a gas transmission conduit and an electrical power transmission conduit for guiding wire, gas and electrical power to the rotatable power connector, and on to the rotatable spindle and torch. A wire feed device is provided for feeding wire from a supply and the entire supply is mounted for rotation with the welding torch about the path of feed of the wire.

5 Claims, 14 Drawing Figures

AUTOMATIC WELDING APPARATUS FOR WELD BUILD-UP AND METHOD OF ACHIEVING WELD BUILD-UP

This is a continuation of application Ser. No. 707,341, filed Mar. 1, 1985 now abandoned.

FIELD OF INVENTION

This invention relates to an automated welding apparatus for weld build-up and method of achieving the same. More particularly, it relates to a fully automated portable or stationary welding apparatus, using the MIG process (Metallic consumable electrode using Inert Gas), and method that is adapted to achieve circular weldings on the bore surface or the outer surface of metallic objects arranged in various manners even where there is small free radial space in the immediate vicinity of the welding area.

DESCRIPTION OF THE PRIOR ART

One application of prior art welding apparatus is the building up of the outside diameter of a shaft or the inside diameter of a bore. Weld build up of a shaft may be necessary where, for example, the shaft has been worn undersize in service, the shaft has been inadvertently undersized during manufacture, or the outer surface of the shaft must be hard surfaced for a particular application. Weld build up of bores may be necessary where, for example, the bore has been worn oversize in service, the bore has been inadvertently oversized during manufacture, or the inner diameter of the bore must be hard surfaced for a particular application. In either case, the manner in which the welding apparatus achieves such build-up is similar. Illustratively, the welding apparatus fuses a layer of metal with an electric arc to the surface of the shaft or bore. Typically, the arc is initiated at some point of the surface of the shaft or bore to be welded and is moved around the circumference of the shaft or bore, depositing metal until the starting point is reached. At this time the arc is moved to a position contiguous to the deposited weld bead and again moved around the circumference of the shaft or bore for deposition of another weld bead. In this manner a layer of metal is fused to the surface of the shaft or bore with the length of the layer dictated by the number of weld beads deposited. One or more layers of metal can be fused to the surface of the shaft or bore depending upon the amount of weld build up required for a desired application.

Automatic welding apparatus for effecting weld build up about either the exterior or the bore surface of metallic objects are well known in the art. See, for example, U.S. Pat. Nos. 3,815,807, 4,323,750 and 4,215,809, and certain automatic welding machinery that is marketed by Cecil Peck Company, of Cleveland, Ohio.

The apparatus described in U.S. Pat. No. 3,815,807 is a pipe welder, made for joining two cylindrical objects and has no means for automatically stepping up to form contiguous beads for building up a surface. The machine can only effect one 360 degree weld and then must reverse rotation to disentangle power leads, gas hose and welding wire and is therefore difficult to be used as a build-up machine.

The apparatus described in U.S. Pat. No. 4,323,750 is specifically designed as a lining machine in which the work piece rotates. It is made for typically large diameter pipe to be lined with another material as in lining a cylinder with stainless steel for corrosion resistance. In this machine the whole welding apparatus enters the pipe which is then rotated on rollers thereby dictating a large minimum diameter.

The apparatus described in U.S. Pat. No. 4,215,809 is specifically designed for build-up but it requires that the workpiece be of limited size and configuration as the apparatus is a lathe and rotates the workpiece while the welding head remains stationary. It would be difficult, for example to build up the I.D. of a crosshole in the end of a long structure with either this apparatus or that of U.S. Pat. No. 3,815,807.

Regarding apparatus of The Cecil Peck Company, generally, such welding apparatus comprises a module equipped with all mechanical and electrical components necessary that is adapted to be rotated about the parts to be welded. Typically a standard commercially available MIG welding unit designed for linear welding is used in such apparatus. For radial adjustment the entire unit, consisting of the wire feed motor and gear reduction assembly and the wire feed rolls together with the torch head, gas hose and power cables plus the wire reel, must be offset and rotated, necessitating abundant clearances. This entire unit must orbit the workpiece even when welding a small bore. The welding power source and control box are the only components of the welding system that are remotely located from the weld site.

All of the above Peck prior art welding apparatus typically include mechanisms for stepping-up the torch head after a circular weld has been finished and the arc stopped. Additional controls are also provided for varying the angular position of the torch head to the weld site as well as varying the radius of the circle that the nozzle will travel.

With respect to weld build-up in general, it is impractical to do build-up using the above described apparatus. Although acceptable for some applications this method has proved less than satisfactory due to lack of automatic step-up and the placement near the weld site of the cumbersome equipment necessary.

Characteristically, the weld deposit operation in these apparatus is suspended for a time interval to allow the torch head of the apparatus to be stepped up one weld deposit diameter to a position contiguous to the completed weld bead for the next circular weld. The suspension of the weld deposit operation during step-up of the torch head changes the operating parameters of the nozzle of the torch head and hence causes the physical characteristics of the weld deposit at the start of a contiguous weld circle to be of low quality in comparison to the weld deposit throughout the remainder of the weld circle. Such low quality welds are susceptible to stress failure as all the stress points caused by stopping and restarting cause a weak line all the way up the tube which can impair the success of the application of the welded metallic object.

Additionally, although such apparatus may be suitable for welding metallic objects, the orbiting of the module about the metallic object to be welded requires a large free space in the immediate vicinity of the welding area. Such space is not always available in which case automatic welding of the metallic object is impossible. Also large, cumbersome items cannot always be moved to the machine or perhaps their configurations do not allow reaching the area to be welded. In these cases the prior art system was hand welding where possible even though automatic welding is always preferable over hand welding during build-up being of higher quality. When done by hand the weld cannot be applied evenly, one cannot be assured of voidless weld metal and heat cannot be distributed evenly, producing unpredictable warpage and shrinkage, and possibly cracks in the workpiece as well. Also, if the hole were too small or too deep hand welding could not be done in any case.

Most importantly, the above described automatic welding apparatus are not readily portable. Typically, they are of such enormity that they are affixed to a permanent work area. Even if they could be carried to the job site, they could not be mounted in proper operative position in a quick and efficient manner. Consequently, they are not readily adaptable for carrying out welding operations in the field. Their size also contributes to their cost which prohibits their use in a repair situation or field work, limiting them to production line use. In the prior art field work was being done by hand where possile or the workpiece was dismantled in order to bring a smaller section to the automatic welding apparatus in the permanent work area, a costly and time consuming task.

It is therefore an object of my invention to provide for a welding apparatus and method that may conveniently, accurately and cost effectively, weld inner or outer circular surfaces of comparatively small or large diameters in a continuous operation and to provide even, concentric welds. This is an advantage for instance, for build-up of worn cylindrical bearing surfaces, both inner and outer, for the repair of broken shafts and cylinders on unweildy equipment, or for any other occasion requiring a circular, evenly applied, strong weld deposit.

SUMMARY OF THE INVENTION

According to the invention, the apparatus for the automatic welding of the metallic object broadly comprises a bore build-up unit and a remote wire feed device unit. The bore build-up unit of the present invention broadly comprises a rotatable spindle connected to a drive means and wire feed means and provided with a rotatable power connector, and an orbital welding torch, having a diffuser-nozzle at one end, which is preferably attached at another end to the rotatable spindle through an offet adjustment means. The drive means rotates the spindle, the offset adjustment means and the torch in endless rotation such that the torch produces circular weldings on an inner bore surface or on an outer surface of a metallic object. The rotatable power connector is provided with a gas transmission means and an electrical power transmission means for guiding gas and electrical power from gas and electrical power conduits, said conduits being attached to the rotatable power connector, on to the rotatable spindle, and a torque resisting means for allowing endless rotation of the spindle without entanglement of the gas and electrified power conduits.

Additionally, the rotatable spindle, the offset adjustment means, and the orbital welding torch are each provided with wire transmission means, gas transmission means and electrical power transmission means for guiding wire, gas and electrical power from a first end to a second end of the rotatable spindle, the offset adjustment means, and the orbital welding torch into communication with the diffuser nozzle at the second end of the orbital welding torch, for achieving automatic welding. A control means can be connected to the rotatable spindle to position the spindle and hence orbital welding torch vertically with respect to a metallic object to be welded for achieving such automatic welding. In application, the apparatus is attached to a welding stand provided with means for receiving and holding the rotatable spindle. The welding stand can be portable or permanently affixed to a stationary object and can also be provided with means for receiving and holding an object to be welded.

The remote wire feed device unit of the present invention comprises a wire feed device, with its own platform, which communicates with the rotatable spindle and the orbital welding torch through a torsionally rigid flexible shaft.

According to a preferred embodiment of the bore build-up unit of the present invention, the rotatable spindle comprises a slender rod, inserted with a flexible conduit liner extending the length of the rotatable spindle through a hole drilled axially through its center. The flexible conduit liner guides welding wire, and hence provides wire transmission means, and a cavity between the flexible conduit liner and the bore of the rotatable spindle allows passage of gas, and hence provides gas transmission means, from the top to the bottom of the rotatable spindle, through the offset adjustment means, and into communication with the orbital welding torch. In addition, the slender rod of the rotatable spindle acts as an electrical conduit, and hence provides electrical power transmission means, guiding electrical power from the rotatable power connector through the offset adjustment means member to the welding torch.

The rotating means for rotating the spindle in endless rotation can be a driven rotor such as a conventional drive sprocket bored to fit loosely over the rotatable power connector. The space caused by the loose fit can be filled with epoxy which both electrically isolates and secures the driven rotor to the rotatable power connector. Illustratively, rotation of a motor and its driving sprocket through a chain causes the driven rotor and hence the rotatable power connector to rotate, which being secured to the rotatable spindle, causes the rotatable spindle to turn in endless rotation.

The orbital welding torch can comprise inner and outer metal tubes and be provided at both ends with drilled plugs. The plug at a first end of the orbital welding torch can be machined to fit a coupling socket on the offset adjustment means member while the plug at the second end of the torch can be machined to fit a diffuser such as a standard MIG diffuser which holds a contact tip and a weld nozzle. A loosely fitting liner extending along the inside surface of the inner tube would guide welding wire through the orbital welding torch from the first end of the torch to the diffuser and hence provides wire transmission means. Additionally, a cavity formed between the inner conduit and the liner, would allow passage of gas from the first end of the orbital welding torch to the diffuser and hence provide gas transmission means. Both pipes conduct electrical power and hence provide electrical power transmission means. Rotation of the rotatable spindle by the driven rotor rotates the orbital welding torch, the orbit of the weld nozzle of the torch defining circular weldings on a bore surface or an outer surface of a metallic object.

Torches of different lengths can be made as dictated by the range of different depths of holes to be welded. Additionally, torches can be made for ranges of diameters extending the radius beyond that permitted by the offset adjustment means member. These torches are easily changed in under two minutes and allow for a variety of work pieces to be welded.

The offset adjustment means can comprise a body member and a sliding torch holder, each being provided with a cavity for gas and wire transmission means. Furthermore, the body member and sliding torch holder provide the offset adjustment means with electrical power transmission means. In the preferred embodiment they are fitted to one another by a dovetail connection which allows the sliding torch holder to move in a radial direction in the body member but they can be fitted to one another using other connecting means. The offset adjustment means can be provided with means for making this motion and for preventing such motion once a desired offset position of the sliding torch holder to the body member is reached. Since in operation the body member of the offset adjustment means is connected to the rotatable spindle and the torch holder is connected to the orbital welding torch, any offset of the torch holder to the body member determines the radius that the orbital welding torch is to be rotated and hence the radius of the circle to be welded.

The rotatable power connector in the preferred embodiment comprises two housings, held in sliding contact by a spring, which are slipped over the end of the rotatable spindle. One housing is fixedly attached to the spindle. Attached to the other housing are a gas feed hose and an electrical power line. Inert gas travels through the gas hose, through enclosures within the housings, which collectively form gas transmission means, and into a cavity between the flexible conduit liner and the bore of the rotatable spindle for communication with the orbital welding torch. Although the gas transmission means previously described dictates the route taken by the gas through the rotatable power connector, other gas transmission means could be substituted. Power from the power line travels through the housings and the rotatable spindle and the offset ajustment means to the orbital welding torch and the tip of the torch, the weld nozzle. The construction of the housings dictates the route taken by the electrical power through the rotatable power connector and hence provides the rotatable power connector with electrical power transmission means, although other power transmission means could be substituted. Because the housing to which the gas hose and power cable are connected is prevented from rotating by a torque resisting means, the rotatable power connector allows the rotatable spindle and hence the orbital welding torch of the welding apparatus to rotate endlessly, without entanglement of the gas hose and power cable. Importantly, the rotating power connector being slipped over the end of the rotatable spindle leaves the end of said spindle free for entrance of the welding wire on center. Thus the welding wire has no inclination to tangle.

The remote wire feed device unit of the present invention comprises generally a wire reel, a wire feed rotatable spindle, a wire feed motor, a slip ring assembly, a wire feed roll assembly, a torsionally rigid hollow flexible shaft and a mounting platform. The wire feed roll draws welding wire from the wire reel through the wire feed rotatable spindle, the wire feed roll assembly and the hollow flexible shaft. This shaft in turn directs the wire into the free end of the rotatable spindle for communication with the orbital welding torch. The rotation of the wire feed device is synchronized with the rotation of the orbital welding torch by way of a synchronizing means, typically the torsionally rigid hollow flexible shaft which is driven from the bore build-up unit by the driven rotor through the rotatable spindle. Alternatively, the synchronizing means can be a gear train interconnecting the rotatable spindle of the bore build up unit to the wire feed rotatable spindle of the wire feed device unit. In this case the hollow flexible shaft need not be torsionally rigid. Advantageously, the synchronization means prevents the irregular turning of the wire exiting the torch nozzle of the orbital welding torch that would otherwise be experienced due to the curvature of the wire from various causes, including its being wound on the wire reel. This irregular turning of the wire while exiting from the nozzle would give unpredictable and erratic placement of the weld bead, an unsatisfactory condition.

The bore build-up unit, if a portable model, further may comprise a welding stand which forms a base. This welding stand can be secured to a work site by magnetic or other means and is easily adapted to any mounting scheme desired. The welding stand can be secured at any angle necessary for alignment with the axis of the metallic object since the welding apparatus operates at any angle. When portable, the bore build-up unit, (attached to the workpiece), and the wire feed device, (typically placed on the floor), comprise two separate units linked to one another by the hollow flexible shaft.

The bore build-up unit can also be constructed as a permanently affixed model mounted on a positioner, i.e. a radial arm or whatever the situation demands. In the case of a permanent installation it would no longer be necessary to have a mounting platform holding the wire feed device unit, rather it could be incorporated with the bore build-up unit on the positioner.

The bore build up unit of the present invention is used with control means which in the preferred embodiment includes a quill positioner device comprising a housing which may be in the shape of a quill and a step up motor with gearing. The quill forms a through cavity for the rotatable spindle and is provided at its ends with bearings for holding the rotatable spindle, allowing it to rotate about its axis inside the quill. The outside surface of the quill is provided with a gear rack connected to gear means for transferring the quill, and hence the rotatable spindle, in an axial direction. During set up on a workpiece, manual operation of electrical circuit switches can rapidly move the quill vertically up and down in the quill positioner, thereby providing axial adjustment of the orbital welding torch for positioning relative to the weld site.

In addition, during welding operation electrical signals from a remotely located control panel, automatically activate the step-up motor which moves the quill axially at each revolution of the rotatable spindle to shift the weld depositing position of the nozzle of the orbital welding torch as required for step-up welding. At the same time this panel controls all other functions, (wire feed, welding power, gas, rotation, etc.) during the entire welding procedure, thereby making it a continuous operation unit the end of the welding task.

The above combination of features makes it possible to extend the present field of application of automatic welding apparatus by minimizing the space and weight requirements. Consequently the apparatus is adaptable for use in welding applications where there is small free space in the immediate vicinity of the welding area. It is readily portable and hence adaptable for carrying out welding operations in the field as well. Due to its small size it should be a relatively inexpensive tool to manufacture and thus be affordable to a broad range of businesses.

A preferred method of welding circular weldings on a bore surface or an outer surface of a metallic workpiece comprises the steps of: continuously rotating an orbital welding torch in a circular path in an amount equal to about 360 degrees around the surface to a limit point while at the same time continuously feeding welding wire and electrical power to the torch to form a substantially circular weld bead on the surface; immediately stepping the torch in an axial direction perpendicular to the circular path upon the torch reaching its limit point for a distance equal substantially to the width of the circular weld bead while at the same time continuing to rotate the torch and continuing to feed the welding wire and electrical power to the torch; rotating the orbital welding torch in a circular path in an amount slightly less than 360° around the surface to a limit point while at the same time continuing to rotate the torch and continuing to feed the welding wire and electrical power to the torch; repeating the latter step as desired; and repeating the first step. With this method there are no discontinuities in the welding operation at the point of step-up. Hence, a continuous weld is effected which is of uniform high quality throughout.

BRIEF DESCRIPTION OF THE DRAWINGS

These and other objects, features and advantages of the invention will be more readily apparent from the following description of the preferred embodiments in which.

DETAILED DESCRIPTION OF THE PREFERRED EMBODIMENT

Figure 1:
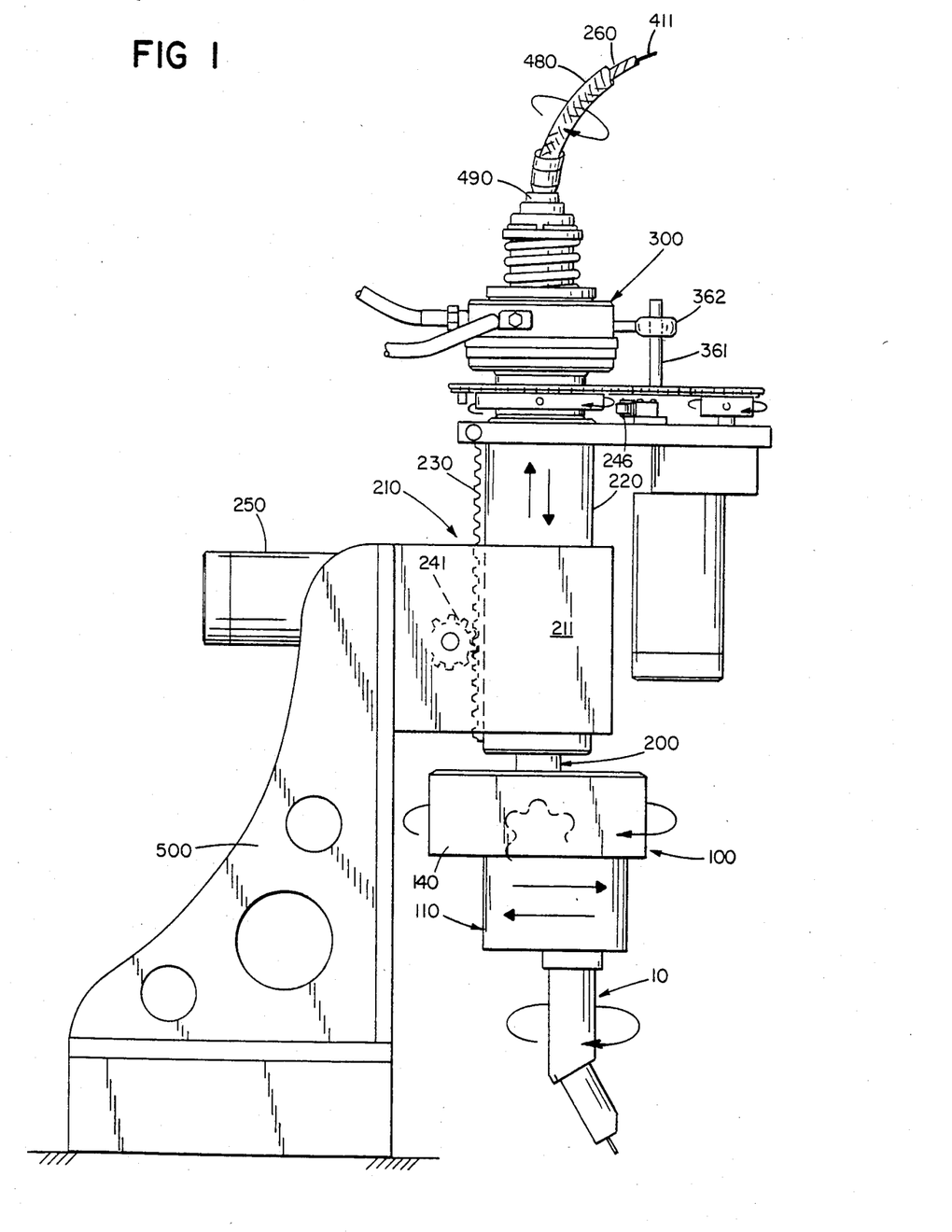
FIG. 1 is a side view of a bore build-up unit of a portable welding apparatus of the present invention as it is mounted to a welding stand with magnetic base.
Figure 2:
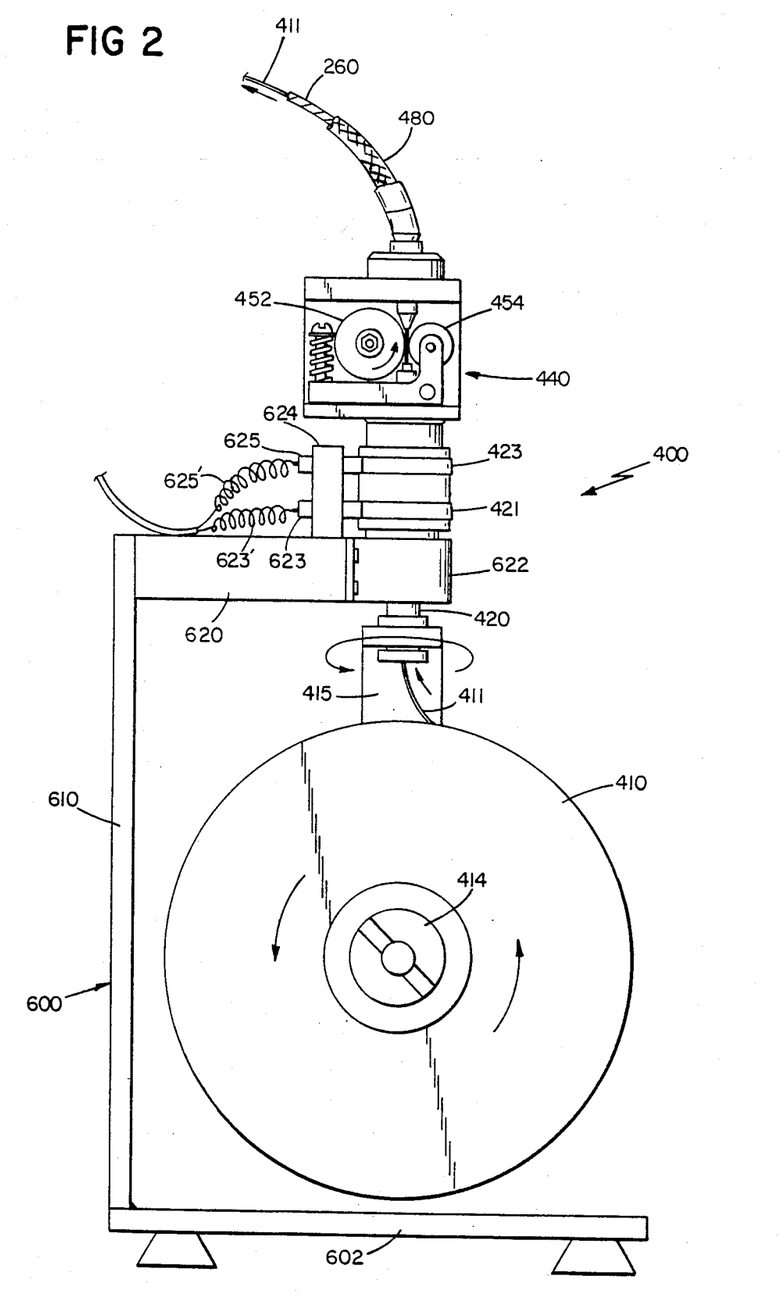
FIG. 2 is a side view of a remote wire feed device of a welding apparatus of the present invention as it is mounted to a platform and which may be used with the unit of FIG. 1.
Figure 3:
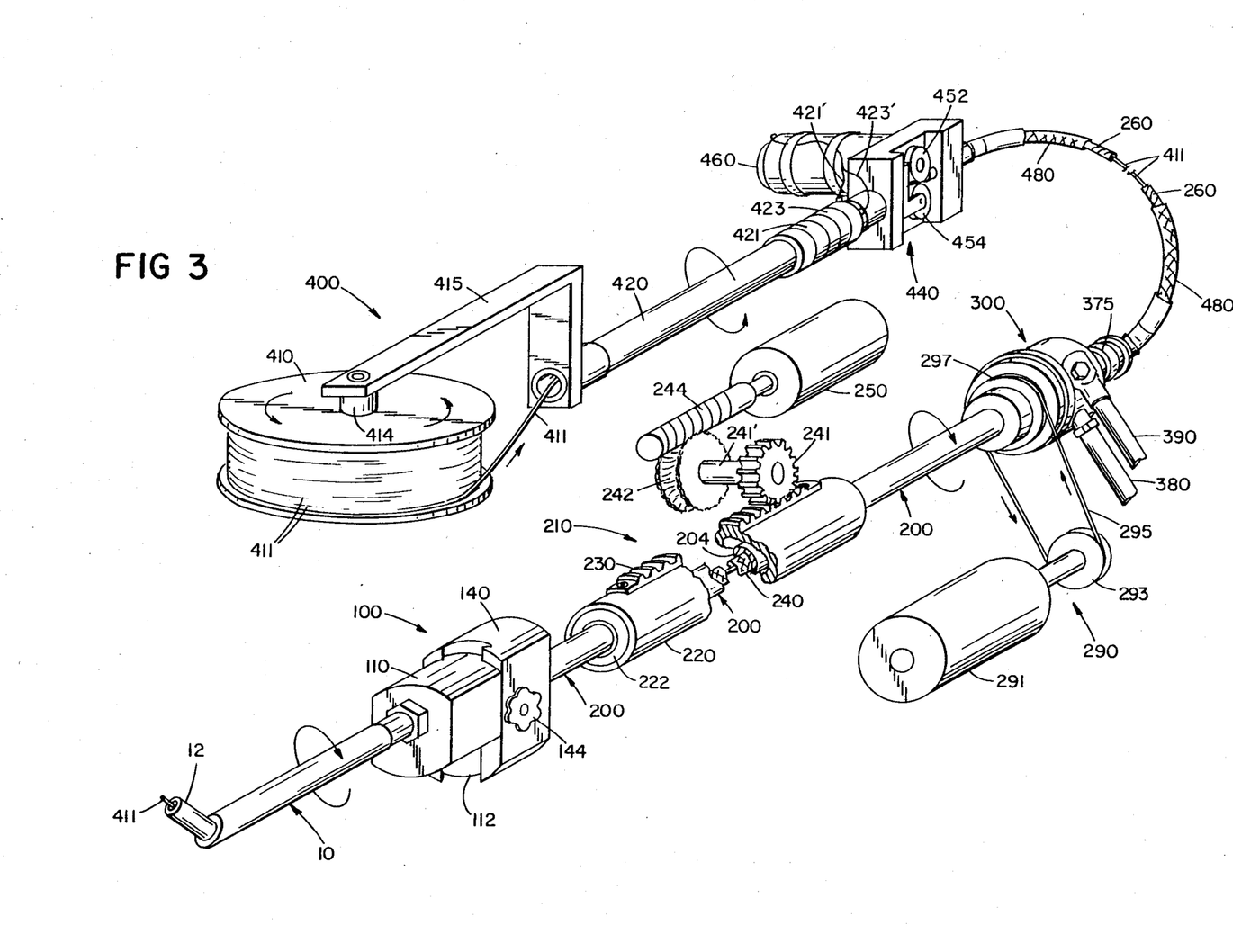
FIG. 3 is a diagrammatic view of a portion of the welding apparatus of FIGS. 1 and 2.

FIGS. 1, 2 and 3 show a preferred embodiment of the welding apparatus of the present invention.

As shown in FIGS. 1 and 3, a bore build-up unit of the welding apparatus of the present invention comprises a rotatable spindle 200 connected to a rotating means 290 and having attached to it, an orbital welding torch 10 through an offset adjustment means 100, a quill positioner 210 connected to the rotatable spindle 200, and a rotatable power connector 300.

As is shown more clearly in FIG. 3, rotatable spindle 200 comprises a metal rod with a hole 204 axially drilled through its center. The rotatable spindle is slipped through the center of rotatable power connector 300, and on through quill 220 of quill positioner 210, and is attached to the body of the offset adjustment means 100 with threads (not shown).

The hole through the rotatable spindle is large enough to allow a piece of flexible conduit liner 240 to be pushed the entire length of the spindle for communication with offset adjustment means 100. The clearance between the outside of the conduit liner 240 and the bore of the rotatable spindle is great enough for passage of inert gas 380 to communicate with the orbital welding torch 10 and hence provides the rotatable spindle with gas transmission means. In another embodiment the hole through the rotatable spindle is large enough to allow a piece of steel tubing 205 (FIG. 7) to be pushed the entire length of the spindle for communication with offset adjustment means 100. Flexible conduit 240 is then pushed the entire length of the steel tubing with the clearance between the outside of the conduit liner and the inside of the steel tubing allowing for passage of the inert gas to communicate with the orbital welding torch. In either embodiment, the flexible conduit liner has a diameter large enough to receive and hold welding wire 411 and hence provides the rotatable spindle with wire transmission means. In this regard, welding wire 411 is pushed from wire feed device 400 by the feed rolls, 452 and 454, through a conduit liner 260 within hollow flexible shaft 480 and into flexible conduit liner 240 within rotatable spindle 200, housed by quill 220, and on into offset adjustment means 100 for communication with the orbital welding torch 10.

Inert gas 380 and welding power 390 enter through rotatable power connector 300. The rotatable spindle 200 carries the inert gas and welding power to the offset adjustment means for communication with the orbital welding torch.

Referring still to FIG. 3, rotating means 290 comprises sprockets 293, 297, a chain 295 and a drive motor 291. Sprocket 297 is a conventional drive sprocket bored to fit loosely over the rotatable power connector. The space is filled with epoxy which both electrically isolates and secures sprocket 297 to rotatable power connector 300. Rotation of drive motor 291 rotates driving sprocket 293, and driven sprocket 297 through chain 295. Rotation of driven sprocket 297, in turn, causes the rotatable power connector to rotate, which, being secured to the rotatable spindle, causes the rotatable spindle to rotate in endless rotation.

Figure 4:
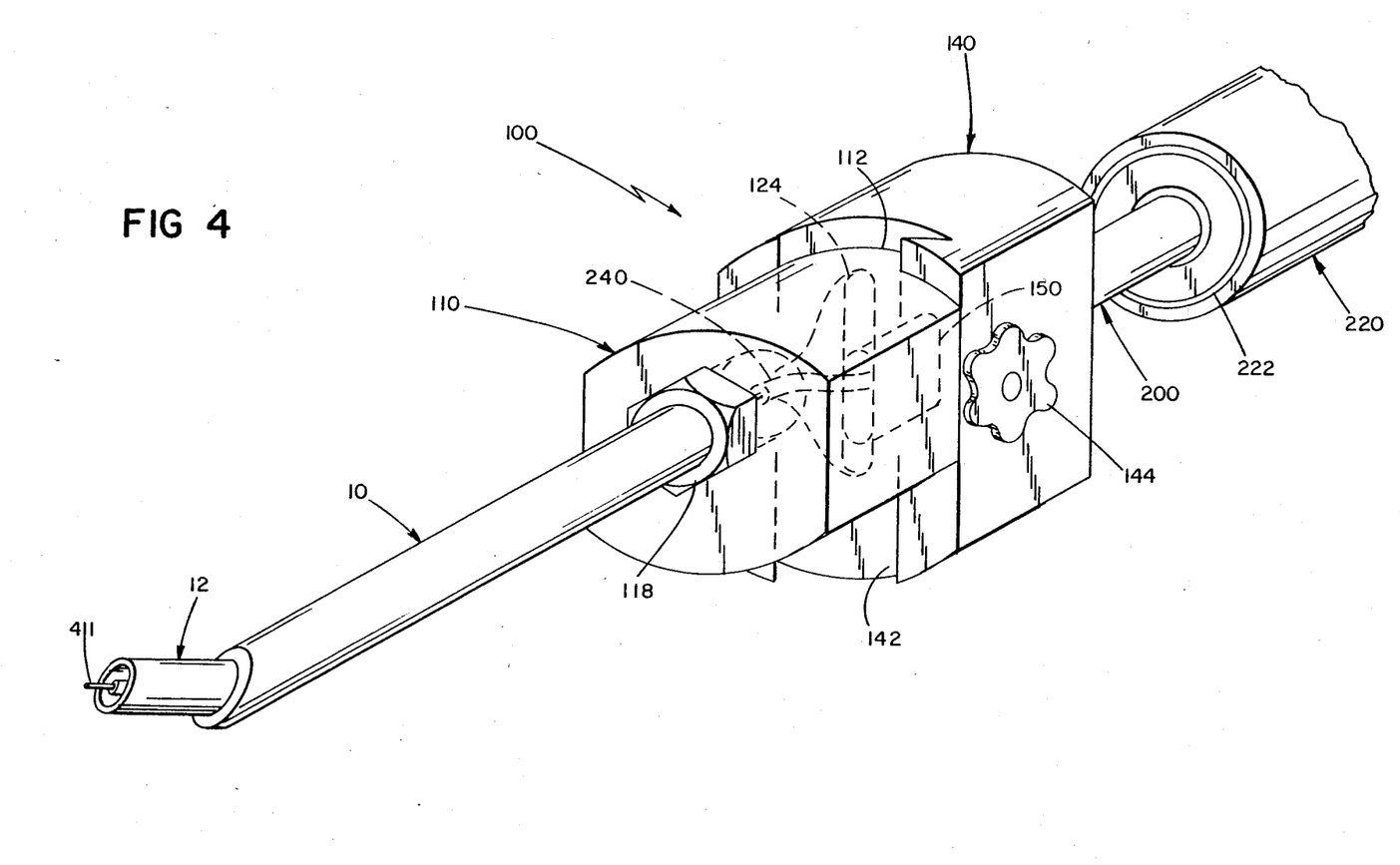
FIG. 4 is an enlarged view of an offset adjustment means as used in the unit of FIG. 1 showing slots for passage of welding wire and gas.
Figures 5A, 5B, 5C, 5D, 5E:
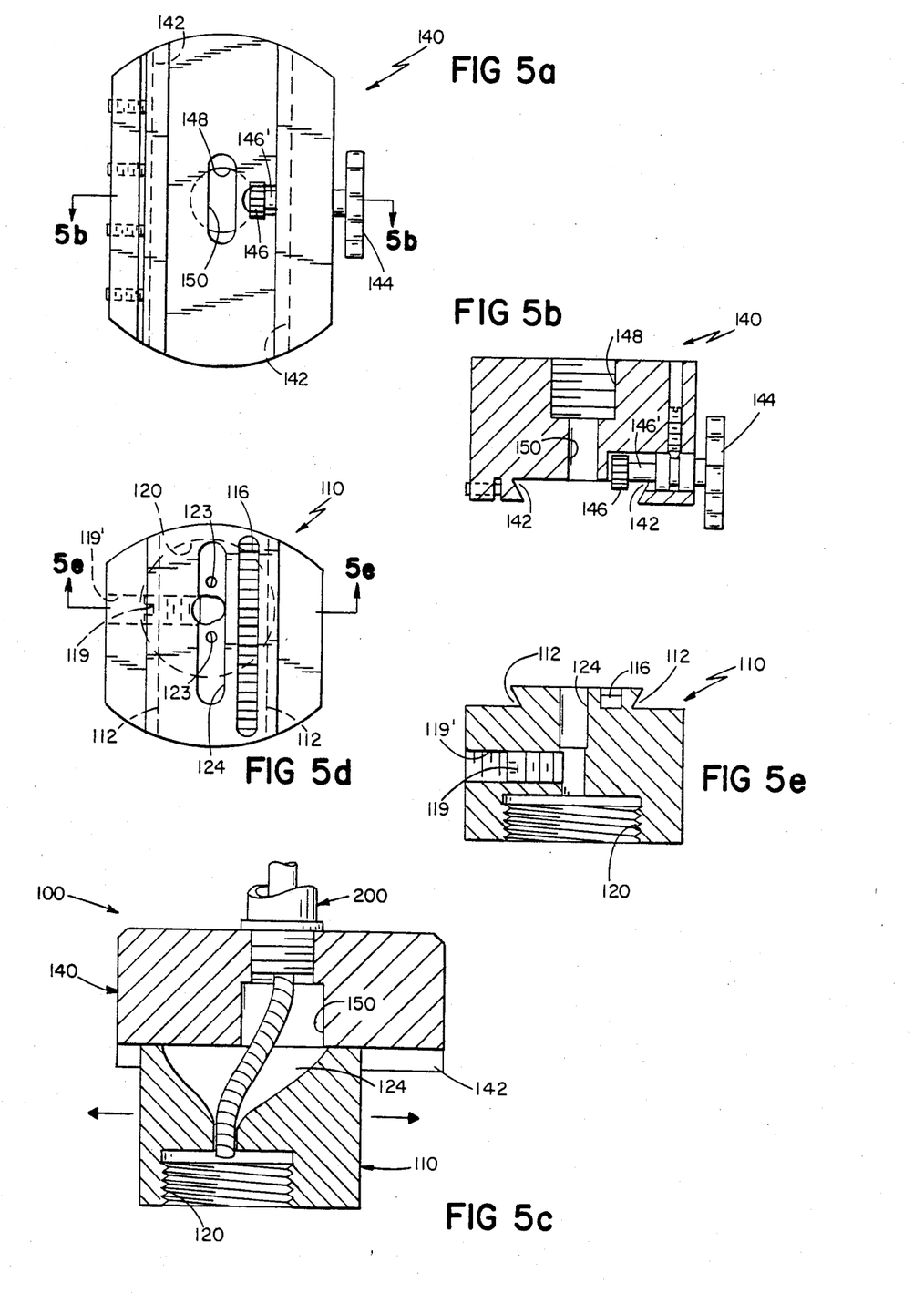
FIGS. 5a and 5b are enlarged aerial and side views of the offset adjustment means of the apparatus of FIG. 4 and cross-sectional views of the offset adjustment means of the apparatus of FIG. 4 taken along line a—a of FIG. 4.
Figures 6A, 6B:
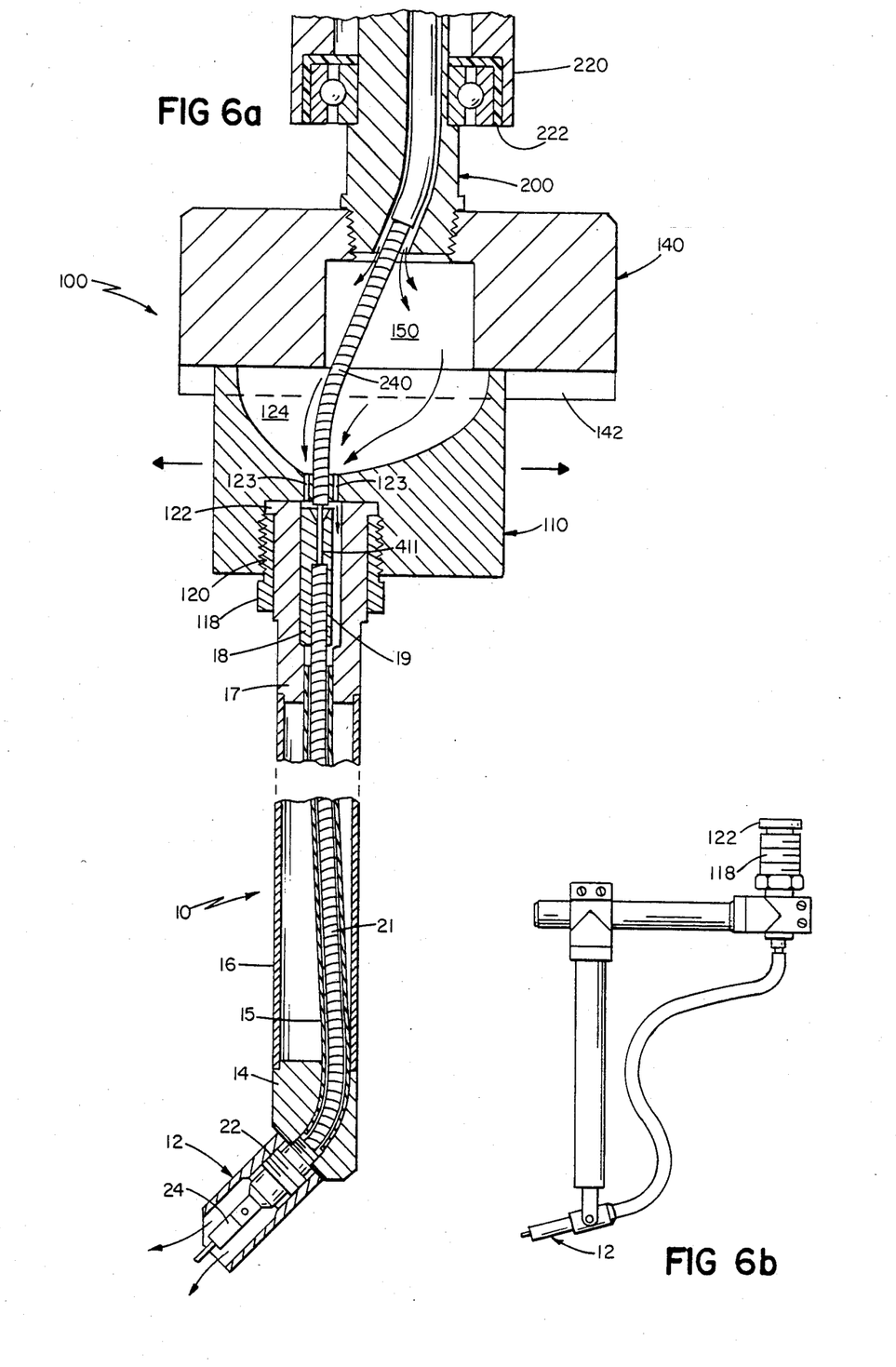
FIG. 6a is the enlarged cross-sectional view of an orbital welding torch connected to the offset adjustment means of FIG. 3.
FIG. 6b is a side view of a further embodiment of welding torch of the present invention designed for large bores and for welding outer surfaces of work pieces.

As shown in FIGS. 4 and 6a, offset adjustment means 100, comprising body member 140 and sliding torch holder 110, connects an orbital welding torch 10 to rotatable spindle 200. The body member and sliding torch holder each have an internal cavity and each have openings at two ends. The cavities provide the offset adjustment means with gas and welding wire transmission means and the body of the offset adjustment means provide the offset adjustment means with electrical power transmission means. The body member and torch holder of the offset adjustment means member are fitted to one another by a dovetail 112 which allows the sliding torch holder to move in a radial direction in the body member. The body member is provided with a hand knob 144 connected to means internal (FIGS. 5c and d) in the body member for this purpose. Advantageously, when orbital welding torch 10 is attached to torch holder 110, and the rotatable spindle is attached to body member 140, any radial sliding motion of the torch holder to the body member permits the axial position of the orbital welding torch to be offset in relation to the axial position of the rotatable spindle. This offset of the torch holder to the body member determines the radius of the orbital welding torch and hence the radius of the circle to be welded.

The means internal to the offset adjustment means member for moving the torch holder relative to the body member is shown in FIGS. 5a, 5e, and 5b, with 5a showing the body member 140 and FIGS. 5d and 5e showing the torch holder 110. The body member is provided with a recessed dovetail 142 in order to engage dovetail 112 of the torch holder when the two are fitted to one another (FIG. 5c). In the body member is a pinion 146 which mates with a rack 116 in the torch holder. A hand knob 144 connected to the pinion forces the dovetail of the torch holder to slide in the recessed dovetail of the body holder. The top of the body member also has a threaded hole 148 to engage screw threads on the bottom end of the rotatable spindle (FIG. 6a). The bottom of the sliding torch holder also has a threaded hole 120 to allow connection of the orbital welding torch. The torch is held in place by an externally threaded bushing 118, pressing against a small flange 122, shown in FIG. 6a, at the butt of the torch.

As shown in FIGS. 4, 5a, 5b and 5c, the body member 140 and sliding torch holder 110 are provided with slots 150 and 124 respectively, which are openings for passing flexible conduit liner 240 from the rotatable spindle through offset adjustment means member to the orbital welding torch. These slots are milled within the central section of the members parallel with the dovetails. The width of the slots is larger than the diameter of the flexible conduit liner 240 in order to loosely receive this liner. In addition, these slots are sufficiently long to permit the torch holder to move relative to the body member without damaging the flexible conduit liner 240 containing welding wire. FIG. 4 shows slots 124 and 150 which are the passageway of the offset adjustment means member through which the flexible liner snakes on its way from the rotatable spindle to the torch. The flexible line provides the offset adjustment means with wire transmission means. Since gas also passes through aforementioned slots, the sliding surfaces of the dovetail and recessed dovetail of the body member and torch holder are closely fit in order to prevent gas leakage. Referring to FIG. 5e, in order to secure the flexible conduit 240 which ends at the torch holder in the offset adjustment means, a set screw 119 at the sliding torch holder enters from the side, clamping the conduit end.

FIG. 6a shows a cross sectional view of orbital welding torch 10 comprising an inner and outer tube 15 and 16, respectively, and weld nozzle 12 as it is attached to offset adjustment means member 100. Inner tube 15 is pushed into the outer tube 16 at one end and is provided at both ends with drilled plugs, 14 and 17. These plugs are welded to the outer tube. Plug 17 at the receiving end of the torch is machined to fit the torch holder 110 of the offset adjustment means member 100. Second plug 14 is machined to fit a diffuser 22 such as a standard MIG diffuser to hold contact tip 24 within weld nozzle 12.

Within orbital welding torch another flexible conduit liner 21, with a transitional fitting 18 attached to one end, is inserted through drilled plug 17 and on into inner tube 15 for welding wire 411 to pass through and hence provides wire transmission means. The transitional fitting has two ducts, 19 and 20, milled along two sides of the cylindrical fitting to provide gas transmission means. These ducts allow passage of inert gas from holes 123 in slot 124 of the torch holder of the offset adjustment means member 100, to a cavity between liner 21 and inner tube 15 of the orbital welding torch, in a similar manner as in the rotatable spindle. The body of the torch provides the torch with electrical power transmission means.

FIG. 6b shows an extension torch for lengthening the radius which the torch can weld. The nozzle 12 can also be pivoted inward to weld the outside of a boss, shaft or the outer circumference of a metallic object. This illustrates the versatility of the machine.

Torches of different lengths can be made as dictated by the range of different depths of holes to be welded. Additionally, torches can be made for ranges of diameters extending the radius beyond that of the offset adjustment means. These torches are easily changed in under two minutes and allow for variations of workpieces to be welded.

Figure 7:
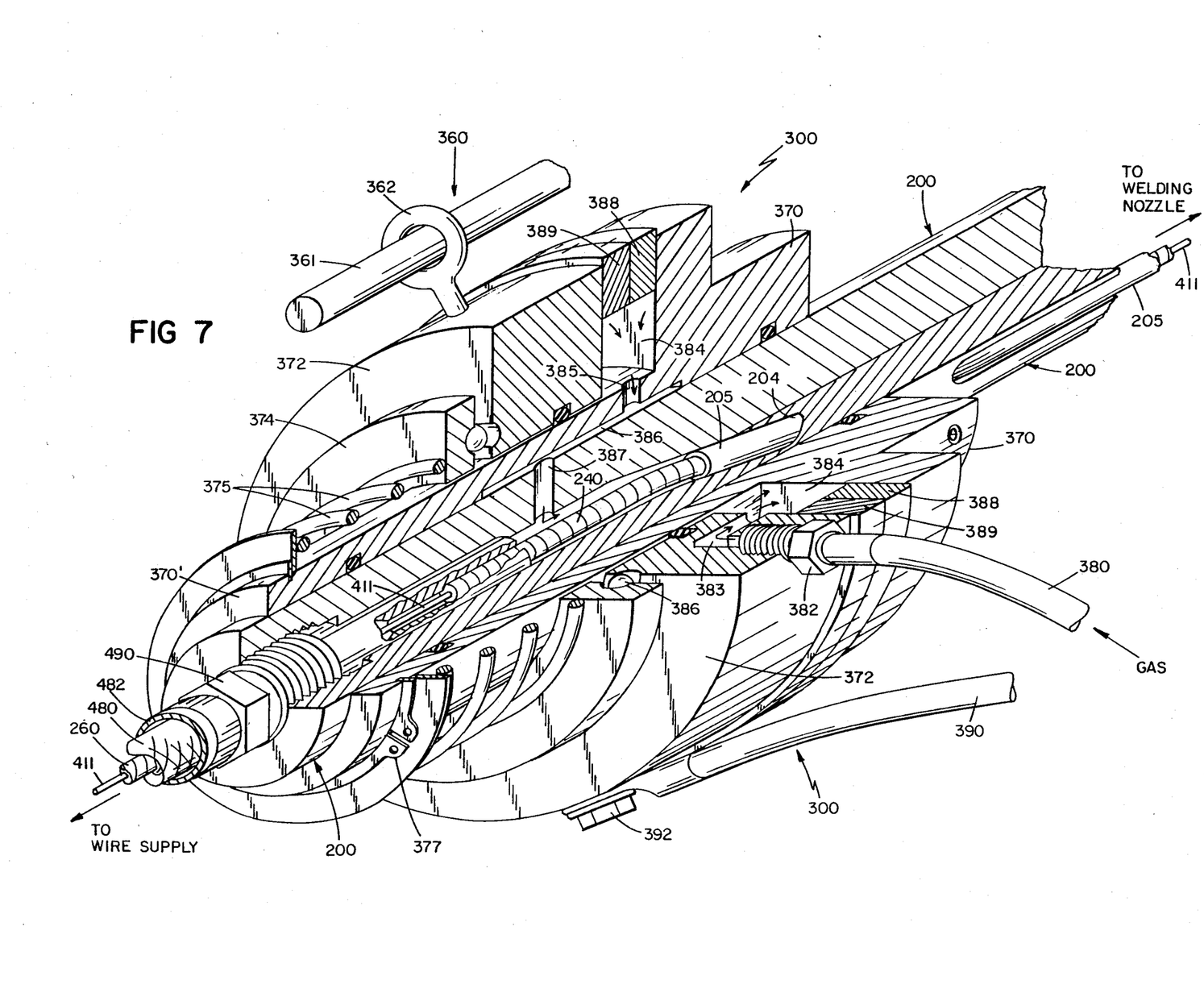
FIG. 7 is an enlarged perspective cross-sectional view of the rotable power connector shown in FIG. 3.

Referring now to FIG. 7, rotatable power connector 300, while providing a gas connection between an inert gas source (not shown) and the rotatable spindle, also transfers power to the rotatable spindle and to the welding nozzle of the orbital welding torch at the weld site. Hence, the rotatable power connector provides the spindle with rotatable power and gas connector means. As shown in FIG. 7, the rotatable power connector comprises first and second bronze washers, 388 and 389, respectively, a rotatable housing 370, and another housing 372 preferrably, all made of solid bronze. The first bronze washer 388 is silver soldered to the rotatable housing 370. The second washer is silver soldered to housing 372 and both this washer and its attached housing are slipped over the stem portion 370' of rotatable housing 370 so that the second washer lies contiguous to the first washer.

Second washer 389 and housing 372 are held in sliding contact with the first washer 388 and rotatable housing 370 by a spring 375 through a ball thrust bearing 374. As shown in FIG. 7, metal spring 375 holds thrust bearing 374 against housing 372 thereby forcing bronze washers 388 and 389 into sliding contact insuring good electrical transfer. A snap ring 377 maintains spring pressure. Current from a power source (not shown) is also fed to the rotatable spindle and the orbital welding torch connected thereto through electrical power transmission means within the rotatable power connector. In the electrical power transmission means for the rotatable power connector, current enters rotatable power connector 300 through attachment bolt 392 which is fixedly attached to the outer surface of housing 372. This current flows through power connector housing 372 to bronze washer 389 which is in sliding contact with bronze washer 388 and hence to the rotatable spindle, since washer 388 is integral to the rotatable spindle.

Still referring to FIG. 7 inert gas enters the rotatable spindle through crosshole 387 in the rotatable spindle shaft. Inert gas gets to crosshole 387 in the following manner. Inert gas in gas conduit 380 enters into housing 372 of rotatable power connector 300. The gas is guided through crosshole 383 to hollow chamber 384, crosshole 385 to hollow chamber 386, and then into crosshole 387 which leads to a cavity formed between flexible conduit liner 240 and the bore of the rotatable spindle. This network provides the rotatable power connector with gas transmission means.

Housing 372 is prevented from rotating by torque resisting means 360 comprising eye screw 362 attached to the outer surface of the housing 372 and adapted to receive and hold a torque resisting bar 361 which is fixedly attached to a stationary platform (FIG. 1). Any turning movement of the housing 372 is resisted by the torque resisting bar.

Because housing 372 to which gas conduit 380 and power cable 390 are connected is prevented from rotating by the torque resisting device 360 the rotatable power connector 300 allows the spindle 200 to rotate endlessly without entanglement of gas hose and power cable. Importantly, the configuration of the rotatable power connector allows the end of the spindle to be left free for entrance of welding wire on center, eliminating inclination of wire to twist.

Referring again to FIG. 3, welding control means for the present invention is provided by quill positioner 210 comprising a housing in the shape of a quill 220, and a step-up motor 250. As shown in FIG. 3 the ends of quill 220 are provided with bearings 222 for receiving and rotatably holding rotatable spindle 200. The quill forms a through cavity for holding rotatable spindle 200, allowing it to rotate about its axis inside the quill when driven by rotating means 290.

The outside surface of the quill is provided with rack 230 for transferring the quill and hence rotatable spindle 210 in an axial direction. As shown in FIG. 3, rack 230 is in mesh with pinion gear 241 which is secured, via shaft 291', to a worm gear 242. The worm gear in turn is in mesh with a worm 244 mounted on the shaft of step-up motor 250.

During operation of the welding apparatus, step-up motor 250, which is drivingly connected through the gear train to rack 230, automatically moves quill 220 with rotatable spindle 200 up or down in the housing support structure 211 of quill positioner 210 secured to welding stand 500, shown in FIG. 1. This motorized shifting of the quill and hence the rotatable spindle 200 repositions the orbital welding torch to a new effective weld depositing position as required for step-up welding.

A control panel (not shown) controls step-up motor 250 as well as rotating means 290 and wire feed motor 460. With respect to providing step-up welding to a metallic object according to a preferred method of the present invention each 360 degrees the step-up motor is activated by a limit switch (not shown) which is tripped by a cam (not shown) on the rotatable spindle. The distance of step-up is determined by control panel, preset by the operator, to switch on the step-up motor for a specific time interval and speed. Upon activation, the step-up motor causes the rotating rotatable spindle in quill 220 and the attached orbital welding torch to vertically climb by way of the rack 230 until the orbital welding torch is in a position contiguous to the completed weld bead. During the rotating rotatable spindle's climb the control panel continues to maintain all other functions (wire feed, welding power, gas, rotation, etc.) thereby making the welding a continuous operation until the end of the welding task.

Referring to FIGS. 2 and 3, the remote wire feed device unit 400 of the present invention comprises wire reel 410, wire feed rotatable spindle 420, wire feed roll assembly 440, a torsionally rigid hollow flexible shaft 480, and a mounting platform 600 for the wire feed device.

Wire reel 410 wound with welding wire electrode 411 is mounted on rotatable support bar 414, which is attached to one end of bracket 415. The wire reel rotates about the axis of the support bar. Wire feed rotatable spindle 420 is fixedly attached at the other end of bracket 415. By this arrangement of wire feed rotatable spindle to wire reel, any rotation of the wire feed rotatable spindle causes bracket 415 to orbit about the axis of the wire feed rotatable spindle, thereby forcing the wire reel to rotate perpendicularly to its own axis in line with the axis of the wire feed rotatable spindle.

A second end of the wire feed rotatable spindle is mounted to a wire feed roll assembly 440, similar to a conventional unit. The wire feed roll assembly includes a wire feed motor 460 (a gear reduction motor) which is drivingly connected to wire feed drive roll 452. A pressure roll 454 presses welding wire against feed drive roll 452. Thus the drive roll grips the wire drawing it from the reel and pushing it into the hollow flexible shaft for communication with the orbital welding torch. Because wire feed rotatable spindle is rotating, power must be supplied to wire feed motor 460 through slip rings 421 and 423. The slip rings are cast in epoxy along with connecting wires 421', 423'. The assembly is bored to fit the wire feed rotatable spindle and machined to expose the slip rings on the outside diameter. The slip rings are connected by way of aforementioned connecting wires to the electrical leads of wire feed motor 460 and the slip ring assembly is pressed onto the wire feed rotatable spindle 420 below the wire feed roll assembly in such a manner that the slip rings are in sliding contact with brushes 623 and 625. Power applied to the brushes passes to the slip rings and is thereby applied to the wire feed motor.

Horizontal plate 620 is also provided with a vertical member 624, protruding from the midsection of the plate, a holder for carbon brushes 623, 625. These brushes provide contact with slip rings 421, and 423. The carbon brushes are fixedly connected at another end to electrical wires 623', 625' that are connected to a power control box (not shown). Power applied to the carbon brushes passes to the slip rings and is applied to the wire feed motor, which drives the wire feed rolls, 452, a driving roll and 454, a pressure roll.

The rotation of the wire feed device is synchronized with the rotation of the orbital welding torch by way of synchronizing means such as the torsionally rigid hollow flexible shaft 480 which is driven from the bore build-up unit by the driven rotor 490 (FIG. 1) through the rotatable spindle 200. In an alternative, syncronizing means may comprise a gear train connected between the wire feed rotatable spindle and the rotatable spindle of the bore build-up unit.

Turning the wire feed assembly as described above is necessary due to the desire to synchronize the two units, the bore build-up unit and the wire feed device unit, to make them behave as if they were on a common shaft, that is, as if the wire feed device were inverted and placed on the end of the rotatable spindle at the power connector. Though it is possible to feed wire through the system without turning the wire feed device in synchronization with the rotatable spindle, there would be irregular turning of the wire exiting the torch nozzle of the orbital welding torch due to the curvature of the wire from various causes including its being wound on the wire reel. This irregular turning of the wire while exiting from the nozzle would give unpredictable and erratic placement of the weld bead, an unsatisfactory condition.

FIG. 2 also shows a mounting platform 600 which is a means for mounting wire feed device 400. Mounting platform 600 includes a base plate 602, an upright 610 and a horizontal plate 620. Horizontal plate 620 is provided with an electrically isolated bearing block 622 for receiving and holding wire rotatable spindle 420. The wire rotatable spindle is rotatably suspended from horizontal plate 620 by bearing block 622.

Wire from the wire feed device 400 communicates with weld nozzle 12 in the following manner. The wire feed roll assembly 440 draws welding wire 411 from the wire reel 410 and forces it into and on through inner conduit liner 260 of torsionally rigid hollow flexible shaft 480, which directs the welding wire in and on through flexible conduit liner 240 of the welding apparatus rotatable spindle 200, through the offset adjustment means member 100, onto and on through inner conduit 21 of the orbital welding torch 10 and into communication with weld nozzle 12.

Essential to operation of the welding apparatus of the present invention are wire and main rotable spindles that retain the electrical potential applied to them by external power sources even when the body of the welding apparatus is grounded. Referring again to FIG. 3, to electrically isolate the main rotatable spindle from the body of the welding apparatus, the ends of quill 220 are fitted with insulated bearings 222. Referring now to FIG. 2, to electrically isolate the wire rotatable spindle from the horizontal plate 620 on the wire feed device mounting platform a layer of insulating material 621 is sandwiched between the outside surface of bearing block 622 and horizontal plate 620.

When considering the totally different concepts regarding the design and location of the components of my invention it becomes evident that it is possible to build the described small, lightweight, completely portable bore build-up machine, utilizing both a remotely located wire feed assembly and remotely located control panel. Such an apparatus and can be carried to the work site by one man and attached to the work by a magnetic base or by mechanical clamping means. There are very few restrictions in using this invention due to its extremely small size. The apparatus can be less than 18" tall and have virtually non-existant requirements for radial clearance, as the only orbiting component need be the nozzle. Using this same concept one could easily construct a bore welding apparatus resembling a dentist drill, a slim basically cylindrical wand with all drive motors, controls, and bulky components placed at another location away from the weld site where space, or radial clearance is not at such a premium. It is evident that this would be difficult with prior art apparatus due to the necessity of all the welding apparatus, except for the power source and the control panel, being located at the weld site. It is the aspects claimed in my invention that make it possible to prevent this entanglement while at the same time putting the necessary cumbersome apparatus at a remote site without entanglement of the various connecting control cables, powerlines, welding wire and gashose.

The welding apparatus has been found to produce high quality weld metal deposits with excellent penetration. The apparatus may be used to resurface the interior of any diameter hollow structure as well as lay a layer of weld material to the external surface of any pipe or shaft of constant radius.

It is evident that numerous alternatives, of the above preferred embodiments will be apparent to those skilled in the art in light of the foregoing descriptions. For example, with respect to the remote wire feed device unit of the present invention, such alternatives may include a stationary version in which the wire feed rotation spindle is mounted integrally to the quill positioner and spindles synchronized in rotation with a gear train. No torsionally rigid flexible shaft would be necessary in that embodiment, but merely a cased flexible conduit liner to direct welding wire into the rotatable spindle. Alternately, where there is ample vertical clearance it would be unnecessary to have the wire feed spindle inverted. The wire feed rotatable spindle could be eliminated by placing wire feed roll assembly with spool bracket 415 attached directly on end of rotatable spindle.

Figure 8:
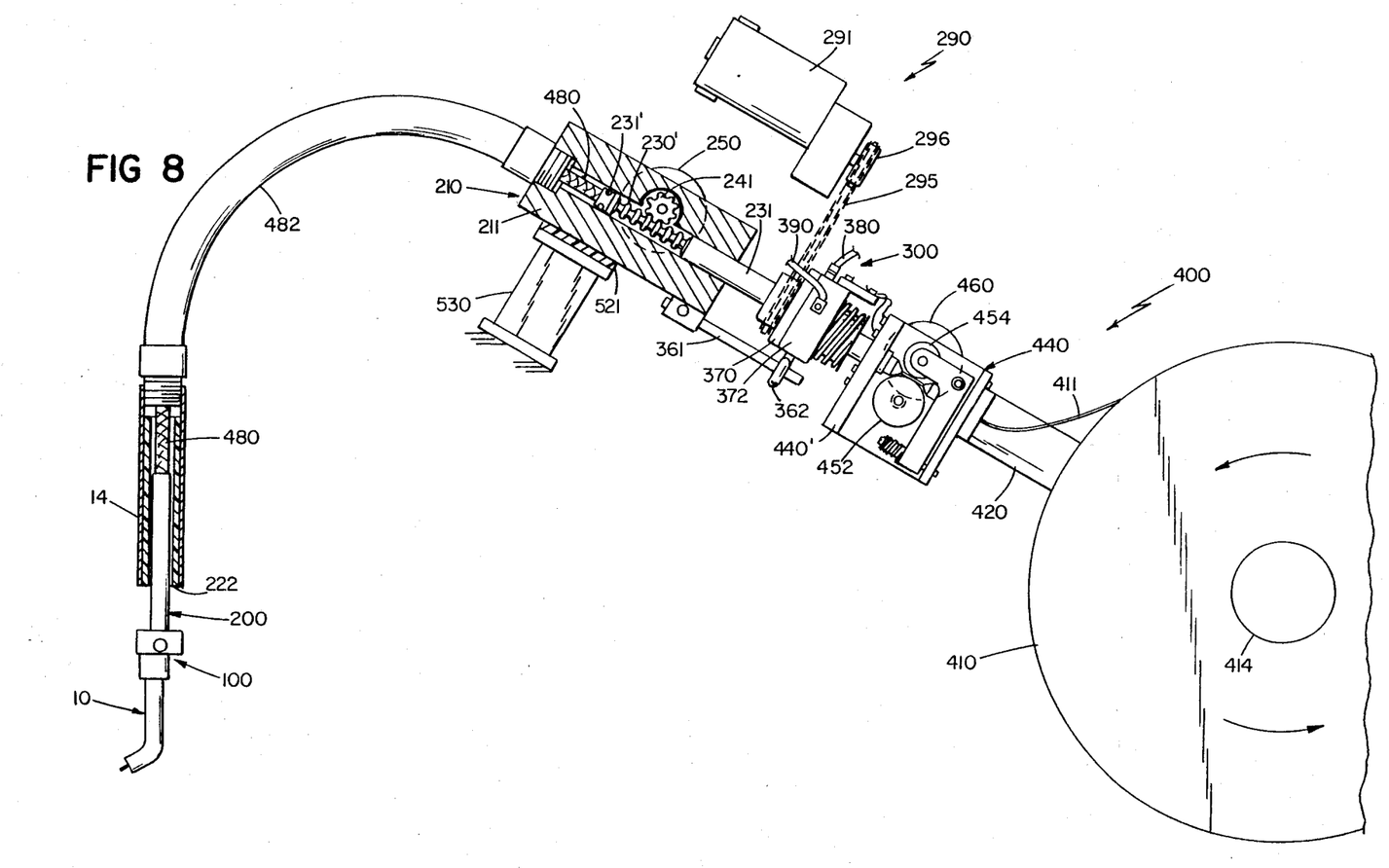
FIG. 8 is a side view of a further embodiment of a portable welding apparatus of the present invention with the quill feeding device, rotation motor, rotatable power connector and wire feed device remotely located from a weld site.

With respect to the bore build up unit of the present invention, such alternatives may include an apparatus as shown in FIG. 8 which depicts a slender welding wand whose body is capable of slipping into still smaller, less accessible holes than the previously described embodiments. In this version a hollow flexible shaft 480 is used for axial placement as well as rotational movement. This allows for the removal of a quill positioner 210 and its gear train (not shown), step-up motor 250, rotatable power connector 300 with its power and gas connections, 390 and 380 respectively, drive motor 291 as well as wire feed device 400 to the other end of the flexible shaft. Thus all that is left at the weld site is a rotatable spindle 200, a miniature offset adjustment means 100 and orbital welding torch 10 supported in electrically insulated bushings 222 within a sheath 14 in and out of which the rotatable spindle 200 telescopes. Shaft 231, (taking the place of the quill 220 in the previously described embodiment), in the quill housing taking the place of the positioner in the preferred embodiment 210, is machined with grooves resembling gear teeth around its circumference through its midsection as shown (taking place of the rack 230 in the original embodiment). Pinion 241 on shaft of step-up gear motor 250 is in mesh with these teeth on shaft 231. As step-up motor 250 is activated, the pinion 241 turns forcing shaft 231 to move axially in housing 211. The flexible shaft 480 is fixedly connected at its one end to shaft 231 and at its other end to rotatable spindle 200. Thus any axial movement of shaft 231 will produce a corresponding axial movement of rotatable spindle 200 in its sheath 14, producing step-up of the weld nozzle. In addition, grooves in shaft 231 allow drive motor 291 to rotate said shaft in housing 211. This rotation is transferred by way of the flexible shaft to the rotatable spindle and thus to the orbital welding torch. Shaft 231 has a hole drilled through its center as does the rotatable spindle of the previously described embodiment shown in FIG. 3. Electrical insulation 521 is sandwiched between housing 211 and mounting bracket 530 to achieve electrical isolation of wire feed device 400 and housing 211 to base. This mounting bracket 530 can be of any configuration depending upon the requirements. Slip ring assembly 430 has been changed to be flat, radially extending rings 421 and 423 mounted on the end of the wire feed housing 450. Copper spring brushes 623' and 625' held by housing 372 through non-conductive holder 624, transfer electrical power to the rotating shaft 210, and thus to the wire feed motor. The flexible shaft also acts as the electrical conduit for the welding power. In addition, the flexible shaft also contains enough clearance around the flexible conduit liner for passage of gas to the orbital welding torch.

The welding wand in FIG. 8 need not be held nor clamped in position. It is merely slipped into the hole to be welded using bushings around its outside, to center, if necessary. Flexible shaft casing 482, being axially rigid, holds the wand sheath in position and the rotatable spindle slips in and out of the sheath as desired for fine axial placement as well as for step-up. Casing 482 is also torsionally rigid so it holds sheath from rotating.

Figure 9:
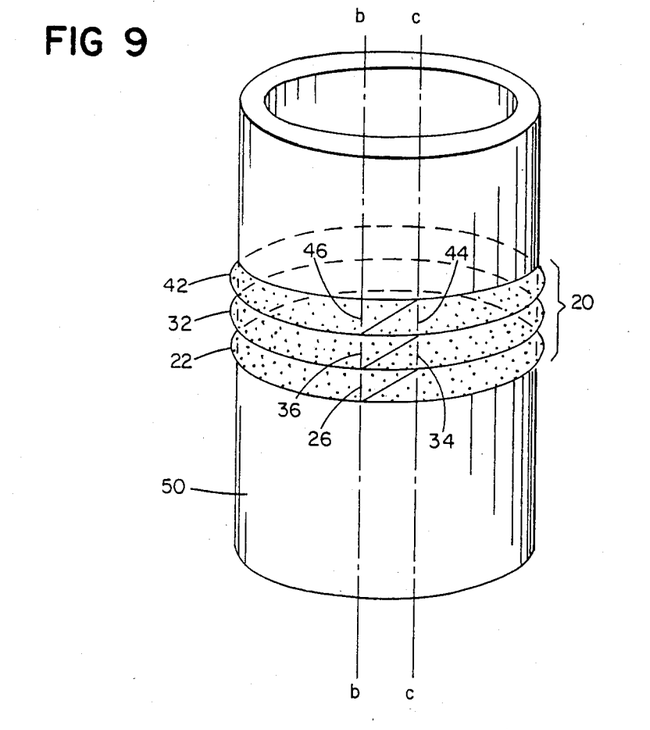
FIG. 9 is a view of a weld layer comprising circular weld beads along the outer surface of a workpiece.

FIG. 9 shows a weld layer 20 comprising circular weld beads 22, 32, and 42 along an outer surface of a metal tube 50 deposited in accordance with the preferred method of the present invention. The step-up welding of weld layer 20 begins with the orbital welding torch (not shown) depositing circular weld bead 22 and ends with the orbital welding torch depositing circular weld bead 42. The path traversed by the orbital welding torch in depositing circular weld bead 22 begins at starting point 26 along phantom line b—b, continues 360 degrees to limit point 26 along phantom line b—b and, after stepping between the limit point to the phantom line c—c, ends at point 34, of circular weld bead 32, along phantom line c—c. In effecting this weld deposit, the orbital welding torch is continuously rotated in a circular path from starting point 26 to limit point 26, a rotation equal to about 360 degrees, while at the same time being provided with welding wire from a wire feed device (not shown) and electrical power. Upon reaching limit point 26, the orbital welding torch is stepped, in an axial direction to the weld bead 22, to a position contiguous to weld bead 22, for depositing weld bead 32. After stepping, the torch is again continuously rotated in a circular path, in an amount slightly less than 360 degrees, from point 34 to a limit point 36 along phantom line b—b. Subsequently the torch is stepped in the same manner as previously described in connection with weld bead 22, to a position contiguous to weld bead 32, for depositing weld bead 42. Weld bead 42 is deposited by a 360 degrees rotation of the orbital welding torch from starting point 44 to limit point 44 along phantom line c—c.

Both the distance between each limit point along phantom line b—b of each weld bead and the corresponding limit point along phantom line c—c of each contiguous weld bead, and the speed that the welding apparatus steps from one weld bead to a contiguous weld beads are parameters programmed by an operator into the control panel (not shown).

With no discontinuities in the welding operation at the point of step-up, a continuous weld is effected by the method of the present invention which is of uniform high quality throughout. Consequently, the welding using the present invention minimizes stress failures usually incident to discontinuous operation of a welding apparatus at the point of step-up.

Additionally, with respect to weld build-up, since step-up occurs only during a specified time interval prior to completion of circular weld, the weld deposits made by the orbiting welding head as it traverses a metal object remains essentially perpendicular to the axis of the bore. If the weld bead were to travel in a helical pattern as a continuous gradual feed in conjunction with rotation would produce, a circumferential triangular wedge would be left unwelded at the beginning and the end of each bore being welded. This is unsatisfactory in most cases. Neither should one return to the unwelded portion to fill in the void. In bore build-up welding it is desirable to complete the operation, once started, without breaking the electric arc as each successive bead tempers the preceeding bead and preheats the path to be followed by the next weld bead helping to relieve stresses and reduce hard spots, leaving a homogeneous weld surface uniform in hardness and grain size. Having the plane of the weld bead perpendicular to the axis of the bore eliminates the unwelded wedge and the necessity of going back to fill in the unwelded portion.

While the above invention has been described in conjunction with specific embodiments, it is evident that numerous alternatives, modifications and variations will be apparent to those skilled in the art in view of the foregoing description.

While I have described a form of my invention utilizing an offset adjustment means, the invention contemplates a welding apparatus which does not include an offset adjustment means. Adjustment would be accomplished by interchanging different torches. Also while the foregoing description refers to step-up operation, the apparatus contemplates effecting a helical weld bead instead of intermittent step-up if desired by merely operating step-up means continuously.

It should also be apparent that step-up need not be electrical but instead could be mechanical, such as a ratchetting means that could be operated by revolution of the rotatable spindle stepping the torch to the next weld circle, or such as a continuously rotating screw to form a helical bead.

I claim:

1. A welding apparatus for circular welding a bore surface or an outer surface of a metallic object, said apparatus comprising a rotatable spindle, a rotatable power connector and a gas connector means operably connected to said spindle, an orbital welding torch operably connected to said spindle, a weld nozzle provided at an end of said torch, an offset adjustment means for radial adjustment of said welding torch with respect to said spindle, a wire feed means for feeding wire to said spindle, and rotating means for rotating said spindle in endless rotation; said welding apparatus being characterized in that;
   (a) said wire feed means operably feeds wire to said torch through said spindle and said offset adjustment means;
   (b) said rotatable power connector is provided with a gas transmission means and an electrical power transmission means for guiding gas and electrical power from external gas and electrical power sources to said rotatable spindle while leaving the spindle free for feeding of wire therethrough; and
   (c) said rotatable spindle, said offset adjustment means, and said orbital welding torch are each provided with wire transmission means, gas transmission means and electrical power transmission means for guiding wire, gas and electrical power along said spindle, said offset adjustments means, and said orbital welding torch and into communication with said weld nozzle for achieving circular welding;

said rotatable power connector comprising first and second metal housings and first and second metal washers; said first housing being fixedly attached to said spindle, said second housing being provided with said gas and electrical power conduits, said first washer being fixedly attached to said first housing, said second washer being fixedly attached to said second housing, and both said second washer and said second housing being slipped over a stem of said first housing so that the second washer lies contiguous to the first washer and is held in sliding contact to said first washer by a securing means; said housings and said washers providing said rotatable power connector with electrical power transmission means and enclosures between said washers and said housings providing said rotatable power connector with said gas transmission means.

2. The welding apparatus of claim 1 wherein the rotatable power connector is made of a solid bronze.

3. The welding apparatus of claim 1 wherein the rotatable power connector is attached to said rotatable spindle, leaving an end of the spindle free for entrance of welding wire.

4. The welding apparatus of claim 1 wherein said rotating power connector comprises torque resisting means including an eyescrew attached to an external surface of the second housing for receiving and holding a torsional resistance bar that is attached to a stationary surface.

5. The welding apparatus of claim 1 wherein said securing means comprises a spring through ball thrust bearing.

* * * * *

UNITED STATES PATENT AND TRADEMARK OFFICE
CERTIFICATE OF CORRECTION

PATENT NO. : 4,687,899

DATED : August 18, 1987

INVENTOR(S) : Rees Acheson

It is certified that error appears in the above-identified patent and that said Letters Patent are hereby corrected as shown below:

Under "Related U.S. Application Data", "Serial No. 207,341" should be --707,341;

Col. 6, line 60, "unit" should be --until--;

Col. 9, line 11, "and d)" should be --and 5d)--;

Col. 9, line 23, "FIGS. 5a, 5e, and 5b, with 5a" should be --FIGS. 5a, 5e, with 5a and 5b--;

Col. 10, line 34, "workpieces" should be --workpiece--.

Signed and Sealed this

Second Day of February, 1988

Attest:

DONALD J. QUIGG

*Attesting Officer*  *Commissioner of Patents and Trademarks*